Nov. 24, 1964   G. L. ADAMS ETAL   3,158,403
SELECTIVELY PREPOSITIONED BIT HOLDER
Original Filed Feb. 24, 1960
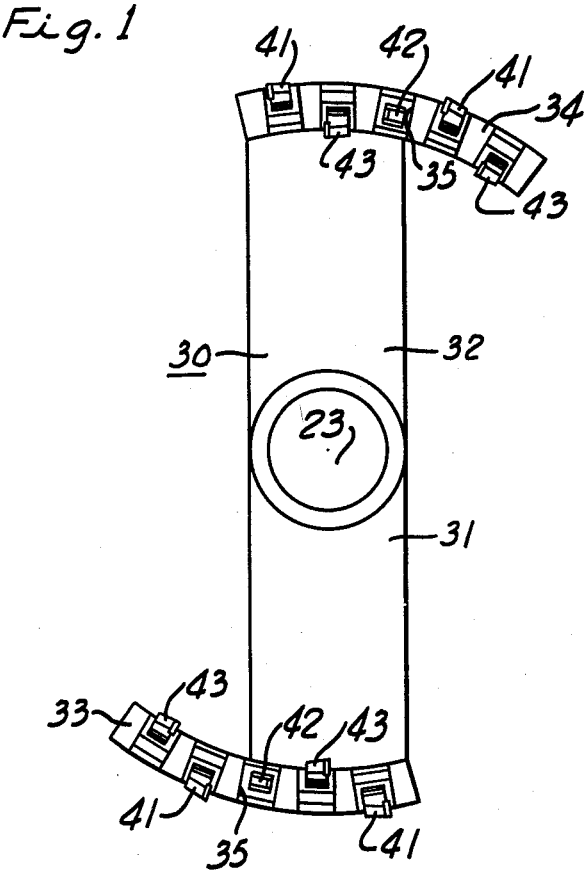
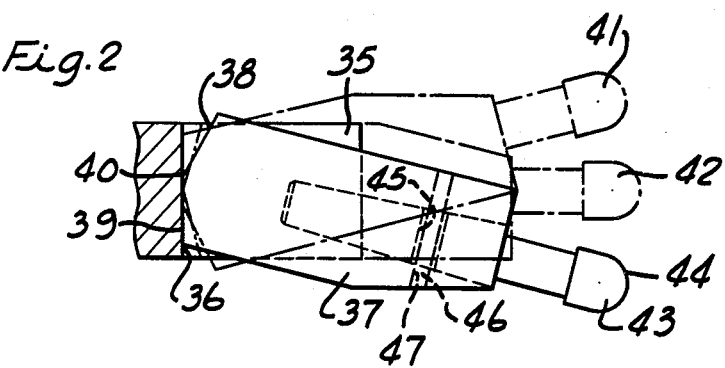
INVENTORS
GEORGE L. ADAMS &
CHARLES T. GOVIN
BY
*William L. Lawther*
THEIR ATTORNEY United States Patent Office 3,158,403
Patented Nov. 24, 1964

3,158,403
SELECTIVELY PREPOSITIONED BIT HOLDER
George L. Adams, Salem, Ohio, and Charles T. Govin, Wauwatosa, Wis., assignors to The Salem Tool Company, Salem, Ohio, a corporation of Ohio
Original application Feb. 24, 1960, Ser. No. 10,773, now Patent No. 3,074,703, dated Jan. 22, 1963. Divided and this application July 5, 1962, Ser. No. 207,743
3 Claims. (Cl. 299—90)

This invention relates generally to bit holders for use on rotary cutting heads in mining machinery and more particularly to bit holders having faces to initially and selectively preposition the bit holders in a predetermined angular position transverse to the axis of rotation of the rotary cutting head and when prepositioned are secured to the rotary cutting head.

This invention is a division of application Serial No. 10,773, filed February 24, 1960, for Lump Producing Head for Coal Augering, which issued on January 22, 1963 as Patent Number 3,074,703.

Bit holders are employed on the forward end of cylindrical or barrel cutters of rotary cutting heads and the like. The cylindrical cutter may be employed on cutting heads of mining machines and in auger strings.

The bit holders comprising this invention may be employed in many different ways. A plurality of gauge faces are placed on the bottom of the bit holder so that upon positioning the bit holder against the flat bottom of the slot in the rotary cutting head, any one of these gauge faces or the apex therebetween may be initially selected to engage the flat bottom of the gauge slot, thereby predetermining the exact corresponding angle in which the bit holder will be placed in relation to rotary axis of the cutting head and barrel or kerf cutter. Upon selectively positioning the bit holder at the predetermined angle the bit holder may be secured to the rotary cutting head by any suitable and convenient manner, such as by welding. The gauge faces thus determine the axis of the bit and thus cut clearance for the cutter head with exactness.

The bit holders comprising this invention have a wide field of application and are not limited to application on barrel or cylindrical cutters or arcuate kerf cutters as necessarily depicted in the drawings.

The principal object of this invention is the provision of a bit holder having gauge faces which selectively engage the transverse surface of a slot in which the bit holder is inserted to position the bit holders at a predetermined angle relative to the barrel wall or kerf cutter and the axis of rotation of the rotary cutting head.

Another object of this invention is the provision of a plurality of faces on each bit holder which are angularly positioned relative to each other in order to cooperate with their gauge slots in a mining head.

Another object of this invention is the provision of a bit holder having a plurality of gauge faces angularly positioned relative to each other forming an apex between the faces, which faces and apex may engage the bottom slot surface to gauge the angular position of the bit holder in a predetermined angular position of the bit relative to adjacent bits and to the axis of rotation of the rotary cutting head.

The bit holder comprising this invention consists of a block which has front and back parallel surfaces to engage like surfaces in a slot in a rotary cutter such as a kerf or barrel cutter. A socket is provided in the top face of the bit block into which a bit may be secured. On the bottom face of the block a plurality of angular faces are angularly disposed relative to each other with an apex therebetween, each of which upon selection may cooperate with the flat or transverse face on the bottom of the slot. After the block has been prepositioned, it is secured within the slot by any convenient method such as by welding.

Other objects and advantages appear hereinafter in the following description and claims.

The accompanying drawings show for the purpose of exemplification without limiting this invention or the claims thereto, certain practical embodiments illustrating the principles of this invention wherein:

FIG. 1 is an end view of a rotary cutter showing different selective positions of the bit holders comprising this invention.

FIG. 2 is a detailed view showing the bit holder in selective positions in the transverse slot provided in the rotary cutter.

As indicated, the drawings merely demonstrate one practical embodiment and application of the bit holders comprising this invention, namely, on an arcuate kerf cutter of a lump producing head for coal augers.

In FIG. 1 there is illustrated for the purpose of explanation an auger cutting head 30 having a central hub member 23. Secured to the hub member 23 are two arms 31 and 32 to the outer ends of which are secured the arcuate kerf cutting arms or rotary cutters 33 and 34, respectively. The top edge of each of these arcuate arms or rotary cutters are castellated by the cutting therein of a series of transverse slots 35, the bottoms 36 of which function as a guide for the pre-positioning of the bit holders 37 comprising this invention. Each bit holder 37 has two faces 38 and 39 formed on its bottom side which come together along the ridge or apex 40. If the face 38 is seated against the flat bottom 36 of the slot, the bit 41 will be positioned to the left as shown in FIG. 2. If the apex 40 is centered against the flat bottom surface 36, the bit in the socket of the bit holder will take the position as shown at 42 of FIG. 2. If however, the face 39 and the bottom of the bit holder is seated against the bottom 36 of the slot 35 the bit assumes the position as shown at 43 in FIG. 2. After the bit holder 37 is prepositioned correctly in the slot 35, the holder is secured to the slot by welding. Thus the bits may be positioned alternately at each of the three positions as indicated in FIGS. 1 and 2 so as to cut clearance not only for the bit holders but for the cutters 33 and 34.

The bit holders 37 may be made of a hard alloy steel so as to assume any wear when engaged and rubbed by the coal being freed from the coal face.

As shown in FIG. 1, each of the cutters 33 and 34 has five bits, two bits 41 and 43 are repeated and the single bit 42 is shown mounted in the center. This is found to be adequate to properly cut the depth kerf at the end of the cutters 33 and 34. The faces 38 and 39 of the bit holders 37 permit one to vary the radial width of the arcuate kerf being cut in the mining face. Also, since the faces 38 and 39 are angularly positioned uniformly relative to one another the radial width of the kerf being cut will also be of uniform width and depth.

As shown in FIG. 2, the bit member is provided with a hardened alloy tip 44 and has an annular slot 45 in its tapered shank to receive the slotted heat treated tube 46 which is compressed when driven in the hole 47 so as to lock the bit tightly within the bit holder 37.

Thus in providing the bit holders 37 with two faces such as 38 and 39 on the bottom side thereof so that the faces are angularly disposed relative to each other, a selection is made possible for the relative position of the bit holder 37 and its corresponding bit in relation to the flat bottom of the transverse slot 35 and in angular relationship with the rotary cutters 33 and 34 of the auger cutting head 30. The apex 40 may also form a gauge in order to position the bit holder 37 as shown by the bit holder containing the bit 42 in FIG. 1. After the selected position has been made the bit holder 37 may be secured to the slot 35 by any suitable method, such as welding.

We claim:

1. A rotary cutter mounted for rotation and having a rotary axis including a bit holder comprising a block with front and back parallel surfaces and having a top and bottom, a bit socket in said block having a longitudinal axis and open in said top of said block, faces angularly disposed relative to each other on said bottom of said block, spaced transverse slots on the forward end of the rotary cutter having opposed parallel sides to receive and embrace said front and back surfaces of said block, a flat surface in the bottom of each of said slots and disposed in a plane transversely of the rotary axis of the rotary cutter, a selected face of said angularly disposed faces engaging the flat surface in said slot and prepositioning said block with the longitudinal axis of said socket in a selected angular position relative to the rotary axis of said cutter, and means to secure said block in the selected position in each of said slots.

2. The bit holder of claim 1 characterized in that said transverse surface in each of said slots is in a plane normal to the axis of rotation of said rotary cutter.

3. The bit holder of claim 1 characterized by an apex between said adjacent angularly disposed faces on said block to engage said transverse surface of said slot and gauge the angle of the axis of said socket in said block intermediate of the positions determined by said faces.

References Cited in the file of this patent

UNITED STATES PATENTS

| 2,784,955 | Compton | Mar. 12, 1957 |
| 2,811,343 | Brown | Oct. 29, 1957 |

FOREIGN PATENTS

| 29,762 | Great Britain | of 1909 |